(12) United States Patent
Bhandari et al.

(10) Patent No.: US 10,845,379 B1
(45) Date of Patent: Nov. 24, 2020

(54) LOW POWER ROTATIONAL DETECTION METHODS AND APPARATUS

(71) Applicant: mCube, Inc., San Jose, CA (US)

(72) Inventors: Sanjay Bhandari, San Jose, CA (US); Kevin Huang, San Jose, CA (US)

(73) Assignee: MCUBE, INC., San Jose, CA (US)

( * ) Notice: Subject to any disclaimer, the term of this patent is extended or adjusted under 35 U.S.C. 154(b) by 153 days.

(21) Appl. No.: 16/101,276

(22) Filed: Aug. 10, 2018

Related U.S. Application Data

(60) Provisional application No. 62/543,885, filed on Aug. 10, 2017.

(51) Int. Cl.
| | |
|---|---|
| *H04R 25/00* | (2006.01) |
| *G01P 15/08* | (2006.01) |
| *A63F 13/211* | (2014.01) |
| *A63F 13/212* | (2014.01) |
| *G06F 3/0346* | (2013.01) |
| *H04R 1/10* | (2006.01) |

(52) U.S. Cl.
CPC ........ *G01P 15/0888* (2013.01); *A63F 13/211* (2014.09); *A63F 13/212* (2014.09); *G01P 15/0885* (2013.01); *G06F 3/0346* (2013.01); *H04R 1/1091* (2013.01); *A63F 2300/105* (2013.01)

(58) Field of Classification Search
CPC .. H04R 25/505; H04R 25/552; H04R 25/554; H04R 1/1041; H04R 2225/41; H04R 2225/55; H04R 2225/61; H04R 2460/03; H04R 2460/07
See application file for complete search history.

(56) References Cited

U.S. PATENT DOCUMENTS

| | | | |
|---|---|---|---|
| 2019/0297431 A1* | 9/2019 | Oesch | H04R 25/505 |
| 2020/0077223 A1* | 3/2020 | Udesen | H04S 7/30 |

* cited by examiner

*Primary Examiner* — Matthew A Eason
(74) *Attorney, Agent, or Firm* — Richard T. Ogawa; Ogawa P.C.

(57) ABSTRACT

A wearable user device includes a first hearing aid configured to be disposed within a first ear of a user comprising a first MEMS accelerometer, a first magnetometer, and a first power source, wherein the first MEMS accelerometer is configured to determine a first plurality of movement data in response to a first head motion of the user, wherein the first magnetometer configured to determine a second plurality of movement data in response to the first head motion of the user; and wherein the first power source is configured to provide operating power to the first hearing aid, the first MEMS accelerometer, and to the first magnetometer, and a processor coupled to the first hearing aid, wherein the processor is configured to determine a first plurality of rotation data associated with the user in response to the first plurality of movement data and the second plurality of movement data.

20 Claims, 1 Drawing Sheet

LOW POWER ROTATIONAL DETECTION METHODS AND APPARATUS

CROSS REFERENCE TO RELATED APPLICATION

The present invention claims priority to U.S. Application No. 62/543,885 filed Aug. 10, 2017, which is incorporated herein by reference.

BACKGROUND

The present invention relates to rotational detection methods and apparatus. More specifically, the present invention relates to ultra-low-powered devices for detecting rotational movement using MEMS-based accelerometers.

The inventors of the present invention have experimented with a number of techniques for determining rotational movement of an object using a MEMS gyroscope. The inventors have determined that typical hardware-based gyroscopes consume several hundred microamps or several miliamps of current during operation. Accordingly, the inventors believe that MEMS gyroscopes are unusable for user-wearable applications, e.g. stand-alone virtual or augmented reality, fitness trackers, smart watches or the like, because the power consumption of the MEMS gyroscope is too high. This is because the inventors believe that the time between charges for user-wearable applications should be maximized.

In light of the above, what is desired are improved methods and apparatus for rotational detection with reduced drawbacks.

SUMMARY

Embodiments of the present invention relate to determining movement of a user. More specifically, embodiments relate to determining rotational movement of a user's head without use of a gyroscope. Some embodiments include the use of two or more MEMS accelerometers, two or MEMS accelerometers in conjunction with one or more magnetometers, one MEMS accelerometer and one magnetometer, and the like. As the rotation rate of a human head is very small, any latency due to the computation of rotational movement from MEMS accelerometer/magnetometer data is believed to be acceptable for the purposes described herein.

According to one aspect of the invention a wearable user device is described. One device includes a first hearing aid configured to be disposed within a first ear of a user comprising a first MEMS accelerometer and a first power source, wherein the first MEMS accelerometer is configured to determine a first plurality of movement data in response to a first head motion of the user, and wherein the first power source is configured to provide operating power to the first hearing aid and the first MEMS accelerometer. An apparatus may include a second hearing aid configured to be disposed within a second ear of the user comprising a second MEMS accelerometer and a second power source, wherein the second MEMS accelerometer is configured to determine a second plurality of movement data in response to the first head motion of the user, and wherein the second power source is configured to provide operating power to the second hearing aid and the second MEMS accelerometer. A device may include a processor coupled to the first hearing aid and the second hearing aid, wherein the processor is configured to determine a first plurality of rotation data in response to the first plurality of movement data, the second plurality of movement data, and a first approximate displacement between the first hearing aid and the second hearing aid.

According to another aspect of the invention a wearable user device is disclosed. One device includes a first hearing aid configured to be disposed within a first ear of a user comprising a first MEMS accelerometer, a first magnetometer, and a first power source, wherein the first MEMS accelerometer is configured to determine a first plurality of movement data in response to a first head motion of the user, wherein the first magnetometer configured to determine a second plurality of movement data in response to the first head motion of the user; and wherein the first power source is configured to provide operating power to the first hearing aid, the first MEMS accelerometer, and to the first magnetometer. A device may include a processor coupled to the first hearing aid, wherein the processor is configured to determine a first plurality of rotation data associated with the user in response to the first plurality of movement data and the second plurality of movement data.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
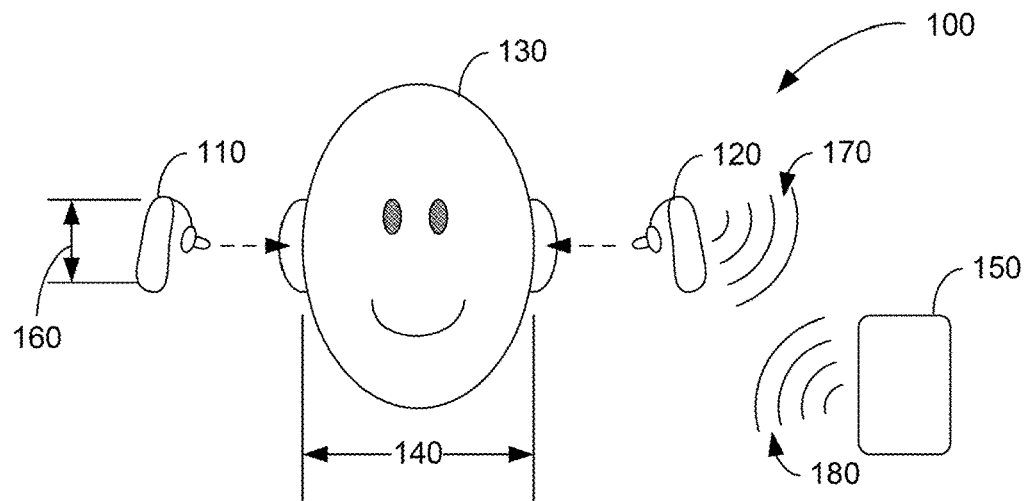
FIG. 1 illustrates some embodiments of the present invention.

FIG. 1 illustrates different embodiments of the present invention. In FIG. 1, an apparatus 100 is illustrated as a pair of hearing aids 110 and 120 that a user 130 wears. In this embodiment, hearing aids 110 and 120 provide modification of incoming audio or sounds for user 130. In various embodiments, modification may include amplification of certain sound frequencies, attenuation of other certain frequencies, and combinations thereof. Hearing aids 110 and 120 may each include a low power processor or the like for controlling the modification of and output of sounds.

In various embodiments, a MEMS accelerometer may be provided within each hearing aid 110 and 120. Each MEMS accelerometer determines a series of movement data with respect to an orthogonal axis (e.g. x, y and z) in response to movement of the hearing aids 110 and 120. In various embodiments, since hearing aids 110 and 120 are typically inserted into the ears of users 130, as the user moves their head, MEMS accelerometers within hearing aids 110 and 120 each generate movement data. In various embodiments, MEMS accelerometers from the assignee of the present invention may be used.

In various embodiments, the movement data from each hearing aid 110 and 120, along with an approximate distance 140 between the MEMS accelerometers can be used to determine rotational movement of the head of user 130. For example if the MEMS accelerometer of hearing aid 110 registers a forward acceleration, and the MEMS accelerometer of hearing aid 120 registers a rearward acceleration, these data can be used to determine that user 130 is rotating their head from right to left (panning motion). In another example, if the MEMS accelerometer of hearing aid 110 registers an upward acceleration, and the MEMS accelerometer of hearing aid 120 registers a downward acceleration, these data can be used to determine that user 130 is rolling their head from to right (roll left/right). In still another example, if the MEMS accelerometer of hearing aids 110 and 120 both register a similar acceleration, these data can be used to determine that user 130 is tilting their head forward/backwards (tilt forward/back). Other acceleration data can be used to compute that user 130 is moving their head in various combinations of pan, roll, and tilt.

In some embodiments of the present invention, hearing aids 110 and/or 120 transmit their respective movement data to a processor, which in turn determines the rotational data. In one embodiment, a processor may be the processor within hearing aid 110 or 120. For example, movement data from hearing aid 120 is provided or transmitted to hearing aid 110, and the processor within hearing aid 110 determines the rotational data. In another embodiment, the processor may be a remote unit 150 from hearing aid 110 or 120. In some examples the remote unit 150 may be embodied as the user's smart device (e.g. phone, watch), a dedicated processing unit, or the like. In some embodiments, a low power consumption processor, such as available from Zorro, Altair, Ambiq or the like may be used. Movement data from hearing aids 110 and 120 are thus provided or transmitted to remote unit 150, and the processor within remote unit 150 determines the rotational data.

In some embodiments, hearing aids 110 and 120 and/or remote unit 150 may communicate via wires or wirelessly 170. Wireless protocols may be used and include, low-power Bluetooth, cellular (4G, LTE, etc.), ZigBee, RF, or other short range communications protocols.

In various embodiments, after determining the rotation movement of the user's head, the processor (e.g. of hearing aid 110 or 120, remote unit 150, smart phone, etc.) may provide responsive data 180 back to hearing aid 110 and/or 120. The responsive data may be transmitted back to hearing aids 110 and 120 by wires or by any of the wireless protocols described above.

In response to the responsive data, hearing aid 110 and/or 120 may modify the incoming sounds, generate new sounds, mute the sounds, or the like. As some examples, if user 130 tilts their head down (e.g. tilt forward), the incoming sounds may be attenuated or muted before they are output to user 130 via hearing aid 110 and 120; if user 130 rotates their left ear towards a sound source, the amplitude of incoming sounds may be increased as they are output to hearing aid 120 whereas the amplitude of incoming sounds may be attenuated as they are output to hearing aid 110; if user 130 tilts their head to the right, the amplification of hearing aids 110 and 120 may increase, and if user 130 tilts their head to the left, the amplification of hearing aids 110 and 120 may decrease; and the like.

In another embodiment, an apparatus 100 comprises a single hearing aid 110 worn by a user 130. In various embodiments, a MEMS accelerometer and a magnetometer may be provided within hearing aid 110. The MEMS accelerometer determines a first series of movement data with respect to an orthogonal axis (e.g. x, y and z) typically at the same time the magnetometer determines a second series of movement data with respect to an orthogonal axis, in response to a movement of hearing aid 110. In various embodiments, since hearing aid 110 is typically inserted into or over the ear of users 130, as the user moves their head, the MEMS accelerometer and magnetometer within hearing aid 110 each generate movement data.

In various embodiments, in response to the first (MEMS accelerometer) and second (magnetometer) series of movement data, a processor within hearing aid 110 processes the data to determine rotational data of users 130 head. In some embodiments, an approximate distance between the position of hearing aid 110 and the middle of user's 130 head (about half of distance 140) may also be used to help determine rotational data.

In additional embodiments, hearing aids 110 and 120 may each include MEMS accelerometers and magnetometers. In still other embodiments, hearing aids 110 and 120 may each include two MEMS accelerometers. In such embodiments, the two or more MEMS accelerometers for each hearing aid may have their sensor axis skewed with respect to each other, or the sensor axis may be aligned. When using two or more MEMS accelerometers for each hearing aid, additional measurements 160 (vertical distance between two MEMS in one hearing aid) may also be used to compute the approximate rotational movement of user 130.

Figure 2:
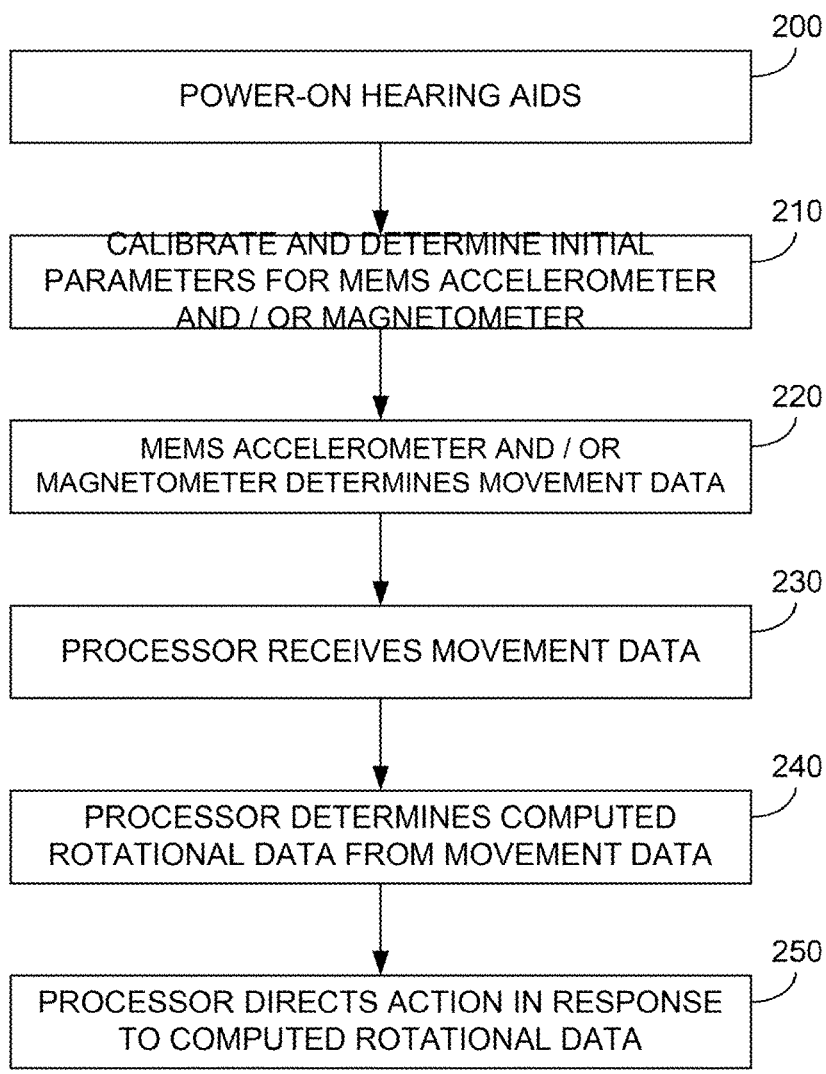
FIG. 2 illustrates additional embodiments of the present invention.

FIG. 2 illustrates a flow diagram according to various embodiments of the present invention. In one embodiment one or more hearing aids having one or more MEMS accelerometers, initially, the user powers on their hearing aids and inserts them into their ears, step 200. In various embodiments, the bulk of the hearing aids, e.g. battery, processor, MEMS accelerometer, etc. may be located on a belt, behind the ear, etc., and an audio tube, wires, ear bud, or the like are placed proximate on top of the user's ear, or into the ear canal.

In various embodiments, the system may be calibrated in step 210. As discussed above, calibration may include the specification of the distance between the locations of the MEMS accelerometers with respect to each other, or the like. The user or audio professional may do this by taking a ruler, and estimating the distance between their ears, between the bulk of the hearing aids, or the like. In other embodiments, the distance may be determined by the processor based upon the arrival times between the hearing aids for a sound generated directly in front of the user compared to arrival times between the hearing aids for a sound generated directly to the right or to the left of the user. In some embodiments, based upon these times, the approximate distance between the hearing aids may also be determined. In some embodiments, other hearing aid parameters may also calibrated in this step, such as hearing aid offsets, hearing aid sensitivity, and the like. Calibration may also include the user performing a series of rotations of their head, e.g. look left the right, look up and down, tilt left and right, etc.

In various embodiments, at least one MEMS accelerometer on one or more hearing aids may sensing user movements, step 220. In some examples, the operating frequency for the MEMS accelerometer may be within the range of 2 or 3 Hertz to about 1.6 KHz, e.g. 100 Hz. In some embodiments that include magnetometers, normally the magnetometers are powered down, and typically after the MEMS accelerometer starts detecting user movements exceeding a threshold, the magnetometers may then be powered up and detect the user movements.

The movement data from the MEMS accelerometer and or magnetometer are then provided to the processing unit, step 230. As discussed above, this may include communicating data between one hearing aid to the other, to the hearing aids to an external processor (e.g. on a belt, a smart device, cell phone, etc.) via wires or wirelessly. Based upon the movement data and the calibration data, the processor can compute the rotational data, step 240.

Next, in response to the rotational data, the processor may direct a particular action, step 250. As discussed herein, such actions may include sending the hearing aids instructions to modify their behaviors (e.g. amplification, equalizer mode, functional mode (e.g. music, speech), playing status audio, and the like).

Other additional actions may be performed by a processor in response to the movement data from hearing aids 110 and 120, instead of simply instructing hearing aids 110 and 120 to modify the audio outputs. For example, in some embodiments hearing aids 110 and 120 may be in-ear buds or headphones within a virtual, mixed, or augmented reality system, and when the user moves their head, a processor within the reality system determines the amount of rotational data. The rotational data can then be input into the optical portion of the reality system to change what is displayed to the user. For example, as the user rotates their head to the right, a virtual object projected to the user is rendered moving to the left on the displays. Accordingly, the virtual object may thus appear stationary in space to the user. In gaming applications, when the gaming processor receives the movement data, the movement data may be used to move the gaming avatar in space, e.g. strafe right/left, move forward/back, etc.; when the gaming processor determines the rotational data, the rotational data may be used to pan, tilt or roll the gaming avatar in space, the rotational data may be used to activate certain actions, e.g. fire weapons, shields, recharge, duck, issue commands or messages, and the like.

In other embodiments, other types of functions may be performed in response to the MEMS acceleration data received, than determining rotational data, such as determining a tap on one hearing aid to adjust properties, such as volume adjust, sensitivity adjust, and the like. In light of the present patent disclosure, it is believed that one of ordinary skill in the art will now recognize may other entertainment, game, or other productivity features that can utilize the rotational data computed above, especially for low-power applications.

Further embodiments can be envisioned to one of ordinary skill in the art after reading this disclosure. In other embodiments, combinations or sub-combinations of the above disclosed invention can be advantageously made. For example, in some embodiments, the sensing units (e.g. MEMS accelerometers and or magnetometer) may be positioned on opposite sides of a pair of glasses, virtual reality device, augmented reality device, headband or the like, near the wearer's temples, behind the ears, or the like. In such embodiments, the sensing units as well as the processor may be wired together or may communicate wirelessly. In additional embodiments, the sensing units may be integrated into different portions of a helmet, such as the sides of a wearer's head, e.g. near the ears or temple of the wearer, the front and back of the head, and the like. In some embodiments, more than two sensing units may be used, e.g three, four. Other embodiments of the present invention may be implantable (e.g. subcutaneous, pacemaker) into a body or onto the body (e.g. contact lens, smart tattoo, etc.). In various of the embodiments discussed above, based upon the acceleration of the sensing units (e.g. MEMS accelerometer and/or magnetometer) and the placement geometry of the sensing units, the rotation of a wearer's head may be approximated. In still other embodiments, the calibration steps and determination steps may be performed using AI techniques, based upon modeled characteristic movements, vector matching, and the like. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A wearable user device comprising:
   a first hearing aid configured to be disposed within a first ear of a user comprising a first MEMS accelerometer, a third MEMS accelerometer and a first power source, wherein the first MEMS accelerometer is configured to determine a first plurality of movement data in response to a first head motion of the user, wherein the third MEMS accelerometer is configured to determine a third plurality of movement data in response to the first head motion of the user, and wherein the first power source is configured to provide operating power to the first hearing aid, the first MEMS accelerometer and the third MEMS accelerometer;
   a second hearing aid configured to be disposed within a second ear of the user comprising a second MEMS accelerometer, a fourth MEMS accelerometer and a second power source, wherein the second MEMS accelerometer is configured to determine a second plurality of movement data in response to the first head motion of the user, wherein the fourth MEMS accelerometer is configured to determine a fourth plurality of movement data in response to the first head motion of the user, and wherein the second power source is configured to provide operating power to the second hearing aid, the second MEMS accelerometer and the fourth MEMS accelerometer; and
   a processor coupled to the first hearing aid and the second hearing aid, wherein the processor is configured to determine a first plurality of rotation data in response to the first plurality of movement data, the second plurality of movement data, the third plurality of movement data, the fourth plurality of movement data, a first approximate displacement between the first hearing aid and the second hearing aid, a second approximate displacement between the first MEMS accelerometer and the third MEMS accelerometer, and a third approximate displacement between the second MEMS accelerometer aid and the fourth MEMS accelerometer.

2. The device of claim 1 wherein the first plurality of movement data comprises changes in strengths of gravity in response to the first head motion.

3. The device of claim 1
   wherein the first hearing aid further comprises a first magnetometer configured to determine a third plurality of movement data in response to the first head motion of the user;
   wherein the first power source is configured to provide operating power to the first magnetometer;
   wherein the second hearing aid further comprises a second magnetometer configured to determine a fourth plurality of movement data in response to the first head motion of the user;
   wherein the second power source is configured to provide operating power to the second magnetometer; and wherein the processor is also configured to determine a first plurality of rotation data in response to the third plurality of movement data, the fourth plurality of movement data.

4. The device of claim 3 wherein an operating data rate for the processor is within a range of 2 Hz to 1.7 Hz.

5. The device of claim 3 wherein the third plurality of movement data comprises changes in strengths of a magnetic field in response to the first head motion.

6. A device of claim 1 wherein the processor is disposed in remote unit that is remote from the first hearing aid and the second hearing aid.

7. The device of claim 1
wherein the processor is embedded within the first hearing aid; and
wherein the processor is coupled to the first power source.

8. The device of claim 1 wherein the first hearing aid comprises a transmitter configured to transmit the first plurality of movement data to the processor, and wherein the transmitter is selected from the group consisting of: Bluetooth, cellular, 4G, LTE, ZigBee, RF.

9. The device of claim 1 wherein the first power source is selected from a group consisting of: a hearing aid battery, and a rechargeable battery.

10. The device of claim 6 wherein the remote unit comprises a smart phone.

11. A wearable user device comprising:
a first hearing aid configured to be disposed within a first ear of a user comprising a first MEMS accelerometer, a second MEMS accelerometer and a first power source, wherein the first MEMS accelerometer is configured to determine a first plurality of movement data in response to a first head motion of the user, wherein the second MEMS accelerometer is configured to determine a second plurality of movement data in response to the first head motion of the user; and wherein the first power source is configured to provide operating power to the first hearing aid, the first MEMS accelerometer, and to the; second MEMS accelerometer;
a processor coupled to the first hearing aid, wherein the processor is configured to determine a first plurality of rotation data associated with the user in response to the first plurality of movement data, the second plurality of movement data, and to a first distance between the first MEMS accelerometer and the second MEMS accelerometer.

12. The device of claim 11 wherein the first plurality of movement data comprises changes in strengths of gravity in response to the first head motion.

13. The device of claim 11
wherein the first hearing aid also comprises a first magnetometer configured to determine a third plurality of movement data in response to the first head motion of the user;
wherein the third plurality of movement data comprises changes in strengths of a magnetic field in response to the first head motion; and
wherein the processor is configured to determine the first plurality of rotation data associated with the user also in response to the third plurality of movement data.

14. The device of claim 11 wherein the first plurality of movement data comprises a data rate within a range of 2 Hz to 1.6 KHz.

15. The device of claim 11
wherein the processor is disposed with the first hearing aid; and
wherein the first power source is configured to provide operating power to the processor.

16. The device of claim 11 further comprising:
a second hearing aid configured to be disposed within a second ear of the user comprising a third MEMS accelerometer, a fourth MEMS accelerometer and a second power source, wherein the third MEMS accelerometer is configured to determine a third plurality of movement data in response to the first head motion of the user, wherein the a fourth MEMS accelerometer is configured to determine a fourth plurality of movement data in response to the first head motion of the user; and wherein the second power source is configured to provide operating power to the second hearing aid, the third MEMS accelerometer, and to the a fourth MEMS accelerometer;
wherein the processor is configured to determine the first plurality of rotation data also in response to the third plurality of movement data the fourth plurality of movement data, and to a second distance between the third MEMS accelerometer and the fourth MEMS accelerometer.

17. The device of claim 11
wherein the first hearing aid comprises a transmitter configured to transmit the first plurality of movement data and the second plurality of movement data, and wherein the transmitter is selected from the group consisting of: Bluetooth, cellular, 4G, LTE, ZigBee, RF;
wherein the processor is coupled to a receiver configured to receive the first plurality of movement data and the second plurality of movement data.

18. The device of claim 11 wherein the processor is configured to calibrate parameters of the first hearing aid in response to the first plurality of rotation data.

19. The device of claim 11
wherein the first MEMS accelerometer is configured to determine a third plurality of movement data in response to a second head motion of the user, wherein the first magnetometer configured to determine a fourth plurality of movement data in response to the second head motion of the user; and
wherein the processor is configured to determine a second plurality of rotation data associated with the user in response to the third plurality of movement data and the fourth plurality of movement data.

20. The device of claim 17
wherein the processor is disposed within a smart device;
wherein the processor is configured to determine an adjustment of an audio property associated with the first hearing aid in response to the first plurality of rotation data; and
wherein the first hearing aid is configured to adjust the audio property in response to the the adjustment.

* * * * *